United States Patent
Baek et al.

(10) Patent No.: US 11,021,231 B2
(45) Date of Patent: Jun. 1, 2021

(54) UNMANNED AERIAL VEHICLE INCLUDING MOUNTING STRUCTURE FOR PROPELLER

(71) Applicant: Samsung Electronics Co., Ltd., Suwon-si (KR)

(72) Inventors: Seung-Chul Baek, Hwaseong-si (KR); Jaeho Kang, Suwon-si (KR); Yeonggyu Yoon, Suwon-si (KR); Min-Woo Yoo, Osan-si (KR); Min-Sung Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 212 days.

(21) Appl. No.: 16/035,493

(22) Filed: Jul. 13, 2018

(65) Prior Publication Data

US 2019/0039719 A1 Feb. 7, 2019

(30) Foreign Application Priority Data

Aug. 3, 2017 (KR) .......................... 10-2017-0098515

(51) Int. Cl.
*B64C 11/02* (2006.01)
*B64C 11/04* (2006.01)
*B64C 27/08* (2006.01)

(52) U.S. Cl.
CPC .............. *B64C 11/02* (2013.01); *B64C 11/04* (2013.01); *B64C 27/08* (2013.01); *B64C 2201/024* (2013.01); *B64C 2201/042* (2013.01); *B64C 2201/108* (2013.01); *B64C 2201/146* (2013.01); *B64C 2201/165* (2013.01)

(58) Field of Classification Search
CPC .............. B64C 11/02; B64C 11/04; B64C 2201/00–22; B64C 2201/024; B64C 2201/042; B64C 2201/108; B64C 2201/165; B64C 27/32; B64C 39/024
See application file for complete search history.

(56) References Cited

U.S. PATENT DOCUMENTS

| 5,542,818 A | * | 8/1996 | Monvaillier | ............ B64C 27/82 |
| | | | | 416/134 A |
| 9,057,273 B2 | * | 6/2015 | Wang | ...................... A63H 27/02 |

(Continued)

FOREIGN PATENT DOCUMENTS

| CN | 105173072 A | * | 12/2015 | |
| CN | 209757504 U | * | 12/2019 | |
| WO | WO-2018107956 A1 | * | 6/2018 | ............. B64C 27/04 |

*Primary Examiner* — J. Todd Newton
*Assistant Examiner* — Christopher R Legendre

(57) ABSTRACT

An unmanned aerial vehicle includes a housing, a wireless communication circuit, a navigation circuit, a plurality of propulsion systems, and a propeller. At least one of the plurality of propulsion systems includes a motor, and a construction disposed to the motor. The construction includes a first side, a second side facing the motor in a direction opposite to the first side, a shaft inserting hole disposed to the second side, and a latching protrusion and a latching groove that are extended sequentially inside the shaft inserting hole. The propeller is fastened to the construction, and includes a hub coupled to the first side of the construction, a fixing shaft that protrudes in a direction of the construction that is inserted to the shaft inserting hole of the construction, and at least one protrusion on an outer circumferential surface of the fixing shaft.

13 Claims, 15 Drawing Sheets

(56) References Cited

U.S. PATENT DOCUMENTS

| | | | | |
|---|---|---|---|---|
| 9,079,115 B2* | 7/2015 | Huang | .................... | A63H 27/02 |
| 10,519,773 B2* | 12/2019 | Muren | .................... | B64C 11/02 |
| 2015/0129711 A1 | 5/2015 | Caubel | | |
| 2017/0240267 A1* | 8/2017 | Tao | ......................... | B64C 11/04 |
| 2019/0039719 A1* | 2/2019 | Baek | ..................... | B64C 39/024 |

* cited by examiner

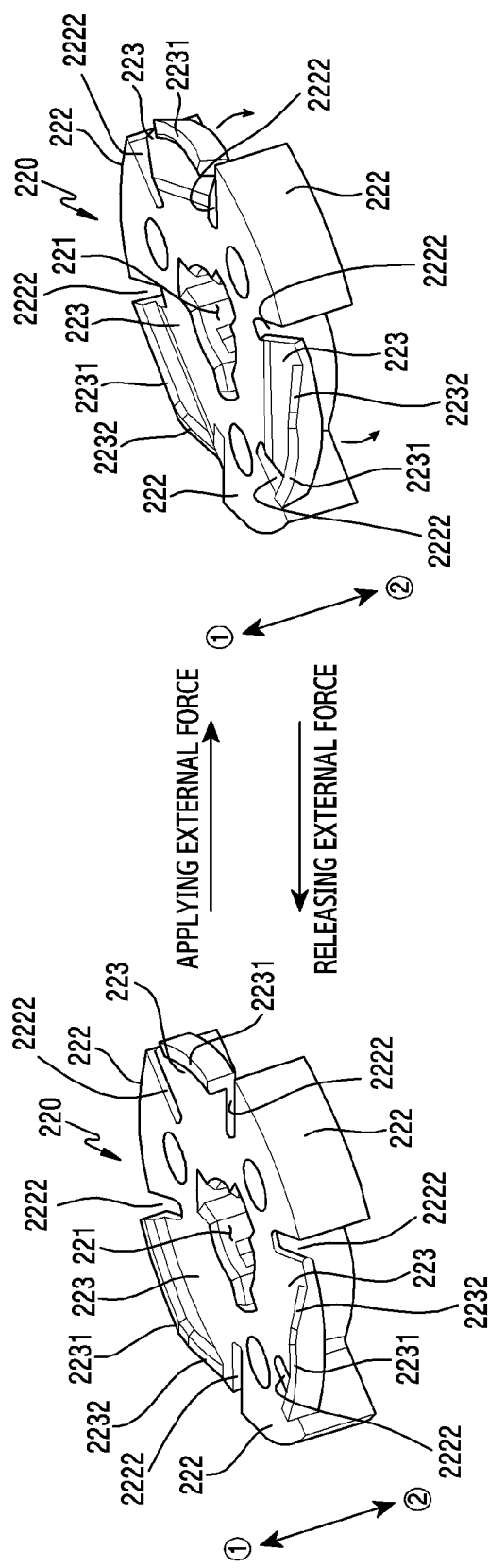
FIG.3CA
FIG.3CB

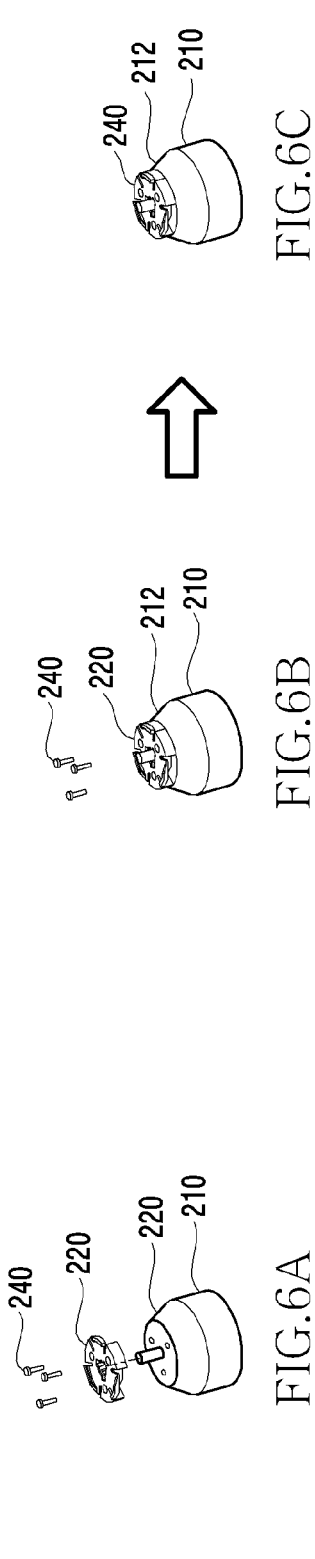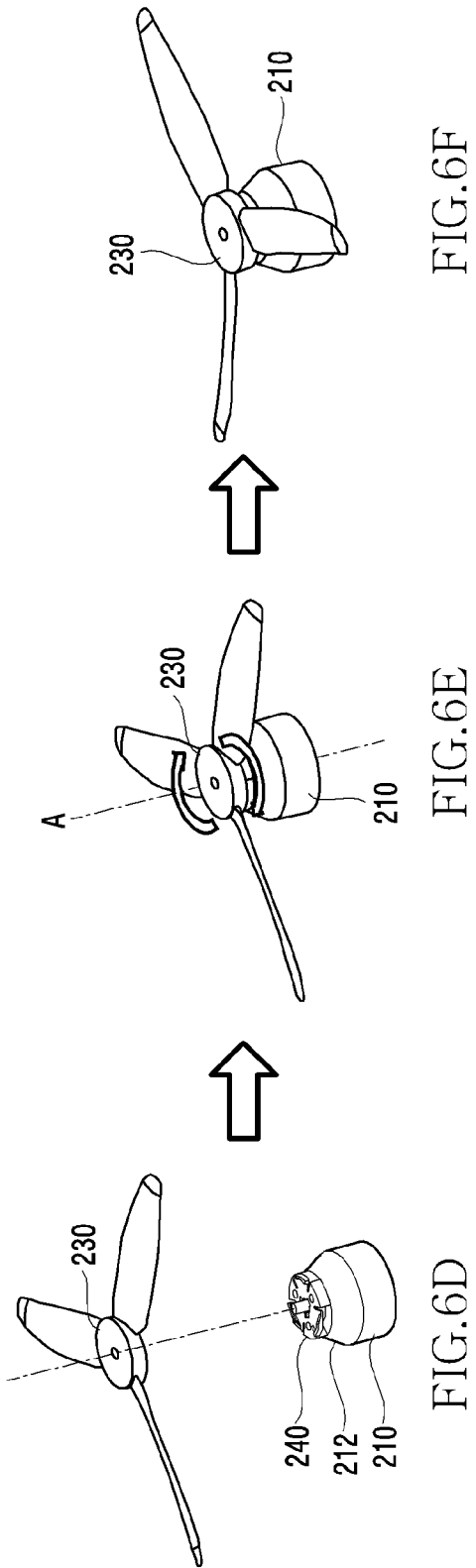

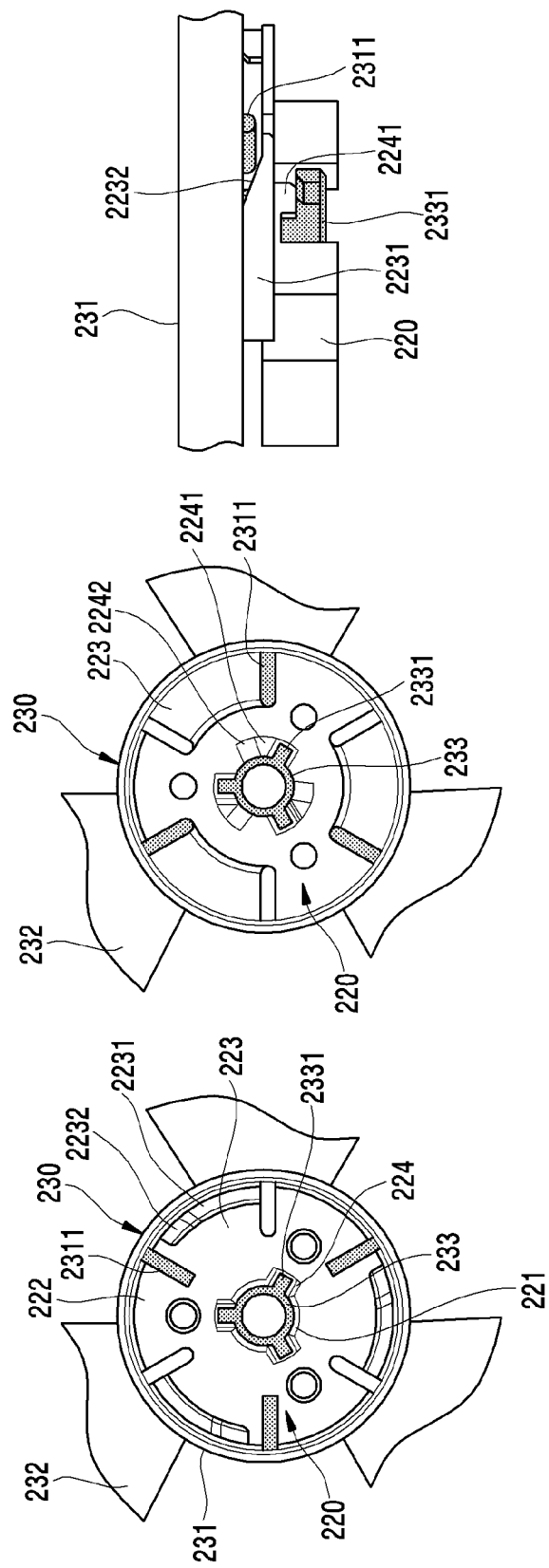

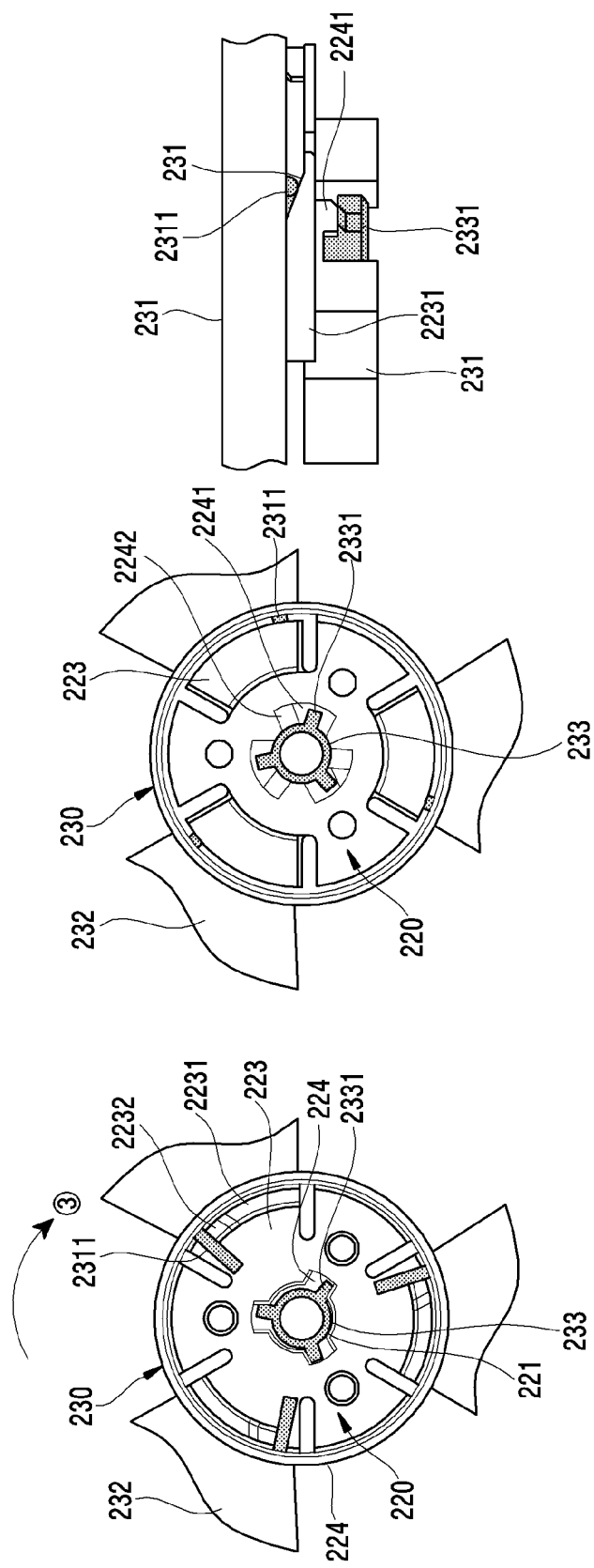

UNMANNED AERIAL VEHICLE INCLUDING MOUNTING STRUCTURE FOR PROPELLER

CROSS-REFERENCE TO RELATED APPLICATIONS AND CLAIM OF PRIORITY

This application is based on and claims priority under 35 U.S.C. § 119 to Korean Patent Application No. 10-2017-0098515, filed on Aug. 3, 2017, in the Korean Intellectual Property Office, the disclosure of which is incorporated by reference herein in its entirety.

BACKGROUND

1. Field

Various embodiments of the present disclosure relate to an unmanned aerial vehicle having a propeller mounting structure.

2. Description of Related Art

Unmanned aerial vehicles can be used throughout whole industries as unmanned flying objects in which a remote control and an automatic flight are possible. Since a navigation control is possible by a separate controller without a person on board, the unmanned aerial vehicle can be implemented to be small in size and light in weight, and can be used for information collection, reconnaissance, or the like in a place where an access is difficult or dangerous by employing an image capturing device. There is an ongoing competition for the unmanned aerial vehicle to more effectively assembly each of constitutional components.

As a propulsion system, the unmanned aerial vehicle may include a plurality of propeller assemblies installed with a specific interval from a housing (e.g., an airframe, a main body, a body, etc.). According to an embodiment, many propeller assemblies may be provided to enable reliable hovering even if the housing is heavy, or the propeller assembly may be produced to have a relatively high output. According to an embodiment, the unmanned aerial vehicle may collide with a person or a facility during flight, causing damage in the propeller protruding from the housing and rotating at a high speed. As a result, the propeller may be frequently replaced. Therefore, conventionally, there is an inconvenience in that the damaged propeller is additionally disassembled to replace it with a new propeller, and a fastening component (e.g., a screw) is disassembled and fastened again by using an assembling tool.

SUMMARY

Various embodiments of the present disclosure relate to an unmanned aerial vehicle having a propeller mounting structure.

According to various embodiments of the present disclosure, an unmanned aerial vehicle may include a housing, a wireless communication circuit disposed inside the housing or coupled to the housing, and configured to be coupled with an external controller through wireless communication, a plurality of propulsion systems coupled to or at least partially inserted to the housing, and a navigation circuit configured to control the plurality of propulsion systems, wherein at least one of the plurality of propulsion systems may include a motor controlled by the navigation circuit, a construction disposed to the motor and including a first side, a second side facing the motor in a direction opposite to the first side, a shaft inserting hole disposed to the second side, and a latching protrusion and a latching groove which are extended sequentially inside the shaft inserting hole, and a propeller fastened to the construction, and wherein the propeller may include a hub coupled to a first side of the construction, a fixing shaft which protrudes in a direction of the construction on a side facing the construction of the cylindrical hub and is inserted to the shaft inserting hole of the construction, and at least one protrusion which protrudes on an outer circumferential surface of the fixing shaft and is mounted to the latching groove by moving over the latching protrusion.

According to various embodiments of the present disclosure, a coupling structure of constructions may include a first construction including a first side, a second side disposed in a direction facing the first side, an inserting hole disposed to the second side, and a latching protrusion and a latching groove which are extended sequentially inside the inserting hole, and a second construction including a fixing shaft, which protrudes in a direction of the first construction on a side facing the first construction and is inserted to the inserting hole of the first construction, and at least one first protrusion, which protrudes on an outer circumferential surface of the fixing shaft and is mounted to the latching groove by moving over the latching protrusion, and when the second construction rotates with a specific rotation amount with respect to the first construction, the first protrusion may be interrupted by the latching groove so that the first construction is fixed to the second construction.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3CA and 3CB illustrate an operation of a tension rib when external force of a construction is applied according to various embodiments of the present disclosure;

FIGS. 6A, 6B, 6C, 6D, 6E and 6F illustrate a coupling process of a propulsion system according to various embodiments of the present disclosure;

DETAILED DESCRIPTION

Figure 1:
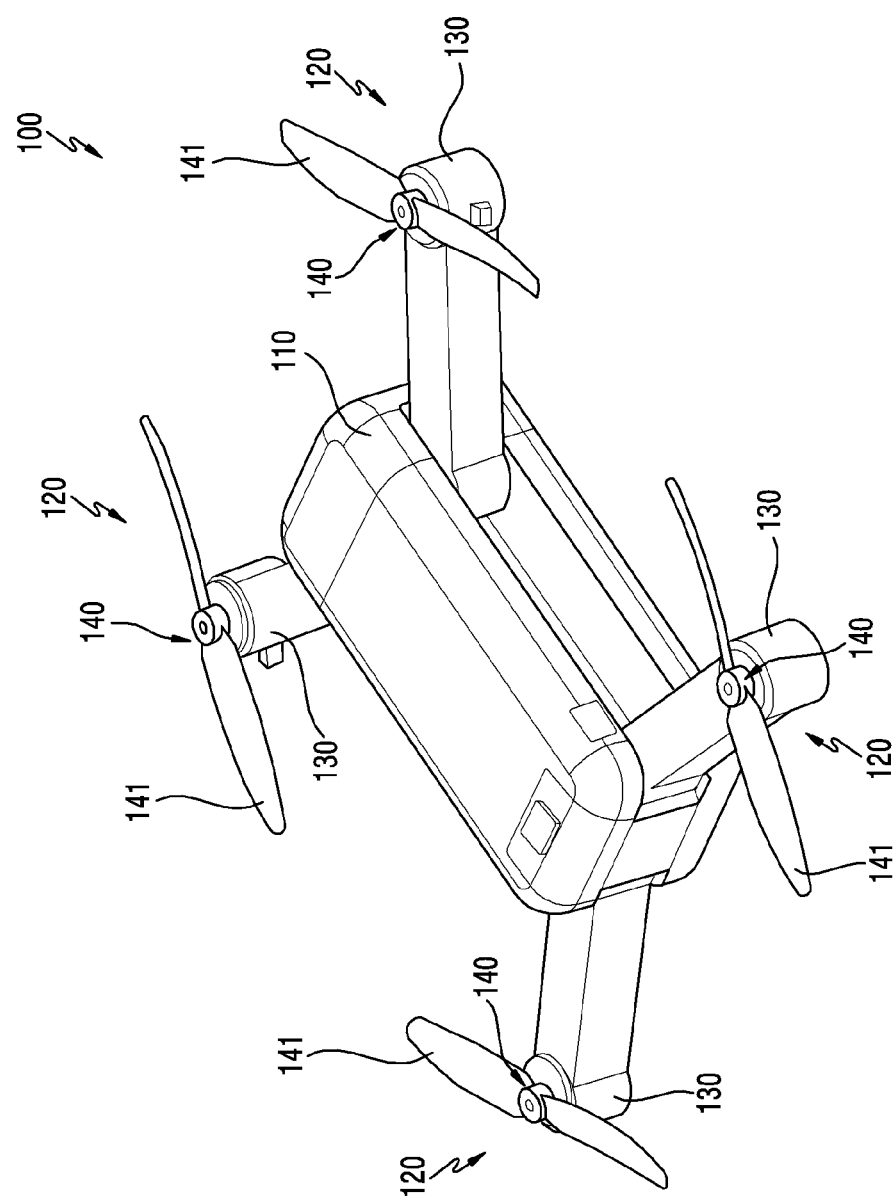
FIG. 1 illustrates a perspective of an unmanned aerial vehicle according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are described with reference to the accompanying drawings. It should be appreciated, however, it is not intended to limit the embodiments of the present disclosure to the particular form disclosed, but, on the contrary, it is intended to cover all modifications, equivalents, and alternatives falling within the spirit and scope of the embodiments of the present disclosure. Like reference numerals denote like constitutional elements throughout the drawings.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the present document to express various constitutional elements, it is not intended to limit the corresponding constitutional elements. The above expressions may be used to distinguish one constitutional element from another constitutional element. For example, the above expressions may be used to distinguish one constitutional element from another constitutional element. For example, a $1^{st}$ user device and a $2^{nd}$ user device are both user devices, and indicate different user devices. For example, a $1^{st}$ constitutional element may be termed a $2^{nd}$ constitutional element, and similarly, the $2^{nd}$ constitutional element may be termed the $1^{st}$ constitutional element without departing from the scope of the present document.

When a certain constitutional element (e.g., the $1^{st}$ constitutional element) is mentioned as being "operatively or communicatively coupled with/to" or "connected to" a different constitutional element (e.g., the $2^{nd}$ constitutional element), it is to be understood that the certain constitutional element is directly coupled with/to another constitutional element or can be coupled with/to the different constitutional element via another constitutional element (e.g., a $3^{rd}$ constitutional element). On the other hand, when the certain constitutional element (e.g., the $1^{st}$ constitutional element) is mentioned as being "directly coupled with/to" or "directly connected to" the different constitutional element (e.g., the $2^{nd}$ constitutional element), it may be understood that another constitutional element (e.g., the $3^{rd}$ constitutional element) is not present between the certain constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the present document are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the embodiments of the present document.

Hereinafter, various embodiments will be described in detail with reference to the accompanying drawings. However, for convenience of explanation, constitutional elements may be exaggerated or reduced in size in the drawings. For example, a size and thickness of each constitutional element shown in the drawings are arbitrarily shown for convenience of explanation, and thus the present disclosure is not necessarily limited thereto.

According to various embodiments of the present disclosure, an unmanned aerial vehicle may include a tri-rotor having three propellers (or propulsion systems), a quad-rotor having four propellers, a penta-rotor having five propellers, a hex-rotor having six propellers, an octo-rotor having eight propellers, and the like. Although the quad-rotor is described for example in the following description, the unmanned aerial vehicle is not limited thereto, and thus the number of propellers and respective configurations and rotation directions may be various.

FIG. 1 is a perspective of an unmanned aerial vehicle according to various embodiments of the present disclosure.

Referring to FIG. 1, illustrates unmanned aerial vehicle 100 may include a housing 110 (e.g., a main body, an airframe, etc.) and a plurality of propulsion systems 120 coupled to the housing 110 or at least partially inserted thereto. According to an embodiment, the unmanned aerial vehicle 100 may include a wireless communication circuit for wirelessly communicating with an external controller and a navigation circuit for controlling the propulsion systems 120 under the control of the external controller.

According to various embodiments, each of the plurality of propulsion systems 120 includes a motor 130 and a propeller assembly 140 fixed to the motor 130 and including a propeller 141 providing lift force for lifting the unmanned aerial vehicle 100 from the ground. According to an embodiment, the propeller 141 of the propeller assembly 140 may rotate in a specific direction by a rotation of the motor 130. According to an embodiment, the propellers 141 included in the respective propulsion system 120 may be controlled to rotate in different directions or in the same direction with each other. According to an embodiment, although not shown, the unmanned aerial vehicle 100 may include an image capturing device for capturing a still picture and/or a moving picture.

According to various embodiments, the unmanned aerial vehicle 100 may cause a frequent collision with a person or a facility during flight. According to an embodiment, the collision may result in a damage of the propeller 141 which protrudes from the housing 110 and rotates at a high speed, and thus the propeller may be replaced frequently. According to various embodiments of the present disclosure, when the propeller 141 is replaced, a separate tool is not required, and the propeller 141 can be firmly and rotatably fixed to the motor only by a simple operation of an operator, and operation reliability can be improved so as not to be randomly deviated during rotation.

Hereinafter, the propulsion system 120 will be described in detail.

Figure 2:
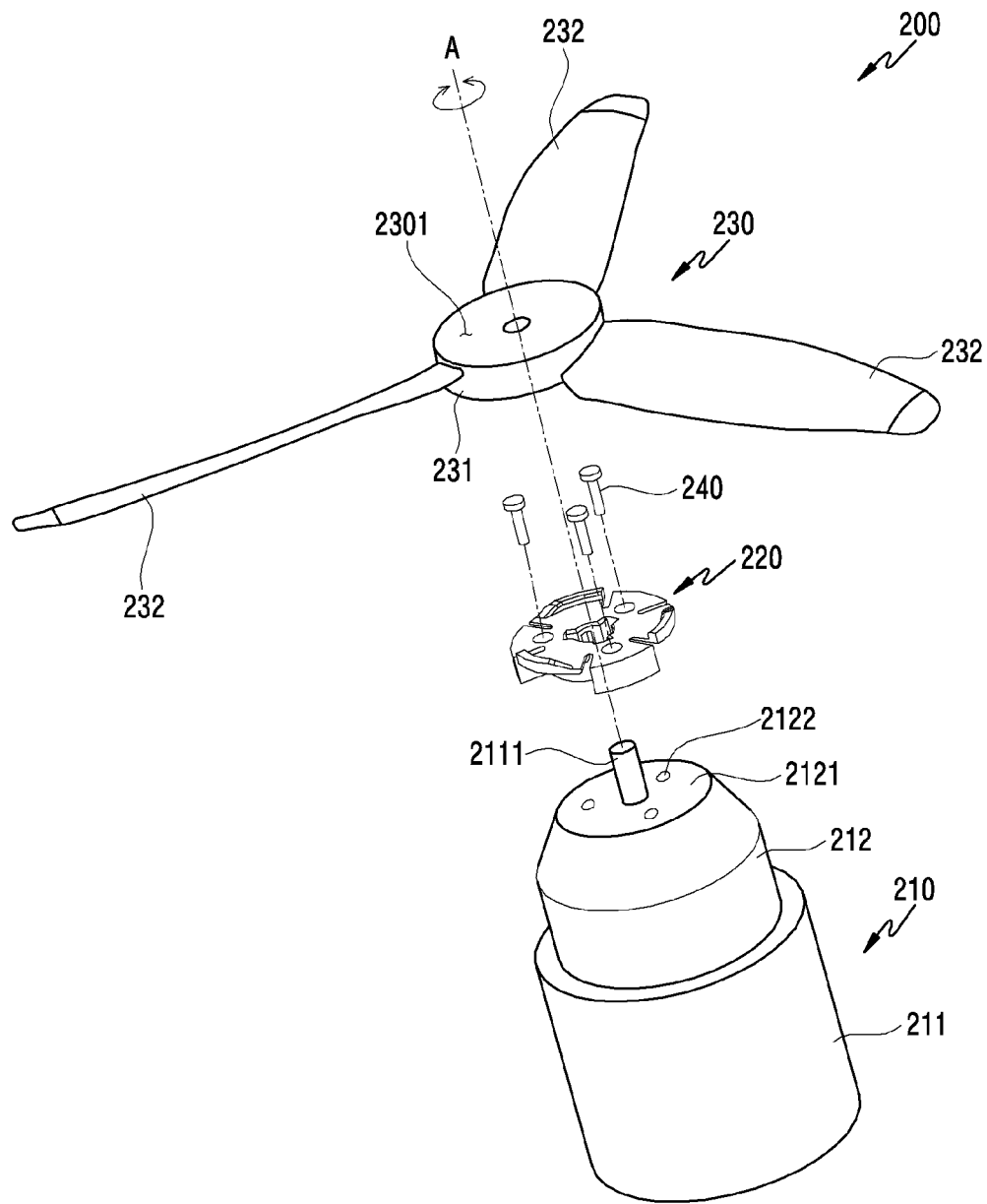
FIG. 2 illustrates an exploded perspective view of a propulsion system according to various embodiments of the present disclosure.

FIG. 2 illustrates an exploded perspective view of a propulsion system according to various embodiments of the present disclosure.

A propulsion system 200 of FIG. 2 may be at least partially similar to the propulsion system 120 of FIG. 1 or may include other embodiments of the propulsion system.

Referring to FIG. 2, the propulsion system 200 may include a motor 210 fixed to a housing (e.g., the housing 110 of FIG. 1), a construction 220 rotatably fixed to the motor 210, and a propeller 230 detachably fixed to the construction 220. According to an embodiment, the motor 210 may include a motor main body 211 and a motor can 212 (e.g., a motor head) installed rotatably in the motor main body 211. According to an embodiment, the construction 220 may be fixed to the motor can 212 through at least one screw 240. According to an embodiment, a driving shaft 2111 protruding in an upper direction may be included in a center of the motor can 212. According to an embodiment, the driving shaft 2111 is fixed to a shaft fixing hole (e.g., a shaft fixing hole 2332 of FIG. 4A) disposed to a fixing shaft (e.g., a fixing shaft 233 of FIG. 4A) of the propeller 230 after passing through a shaft inserting hole (e.g., a shaft inserting hole 221 of FIGS. 3AA and 3AB) disposed to the construction 220, and thus can directly deliver rotation force of the motor 210 without a loss to the propeller 230 or may assist the rotation force of the propeller 230 through the construction 220.

According to various embodiments, without being limited thereto, the propeller 230 may not be operatively coupled to the motor 210, and may be coupled to the construction 220 so that the rotation force of the motor 210 is indirectly delivered through the construction 220.

According to various embodiments, the propeller 230 may include a circular hub 231 detachably coupled to the construction 220 and a plurality of blades 232 extended in a circumferential direction from an outer surface of the hub 231. According to an embodiment, the hub 231 may include a first side 2301 facing a first direction and a second side (e.g., a second side 2302 of FIG. 4A) facing a second direction opposite to the first direction. According to an embodiment, the propeller 230 may be assembled in such a manner that the second side (e.g., the second side 2302 of FIG. 4A) of the hub 231 is detachably coupled to the construction 220.

According to various embodiments, the propeller 230 coupled to the construction 220 may rotate in a specific direction (e.g., a clockwise direction or a counterclockwise direction) when the motor can 212 of the motor 210 rotates about an axis A as a rotation axis. According to an embodiment, the propeller 230 may be easily fastened or detached without a separate fastening/detaching tool due to a fastening structure between the hub 231 and the construction 220, thereby facilitating easy replacement for maintenance.

Figure 3A:
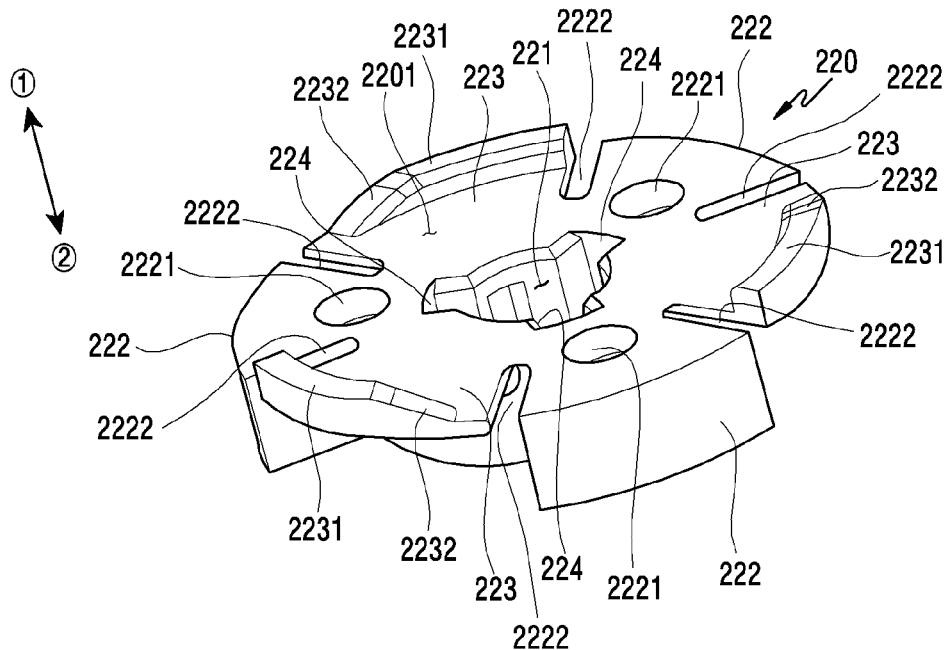
FIGS. 3AA and 3AB illustrate a front perspective view and a front view of a construction respectively according to various embodiments of the present disclosure.
Figure 3A:
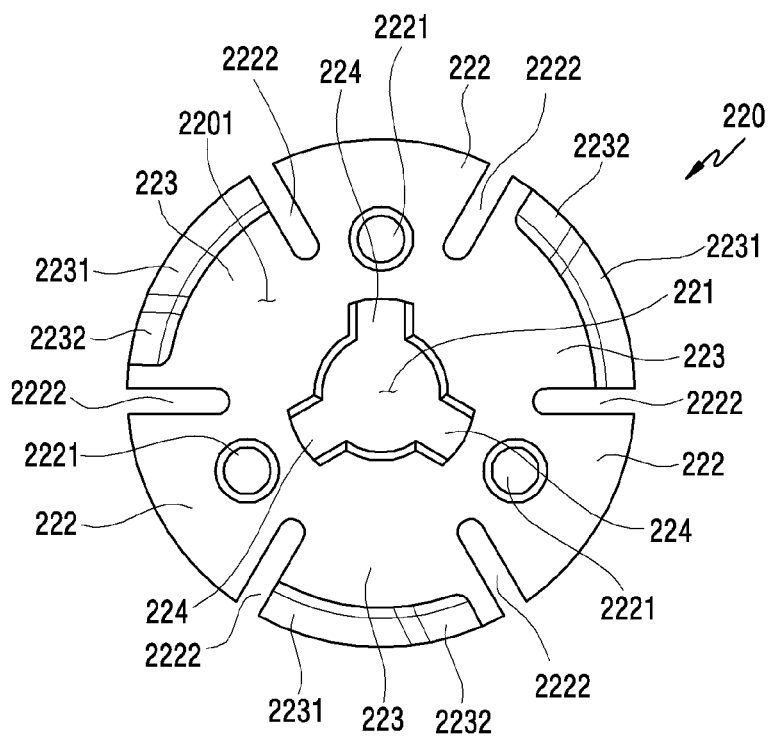
Figure 3B:
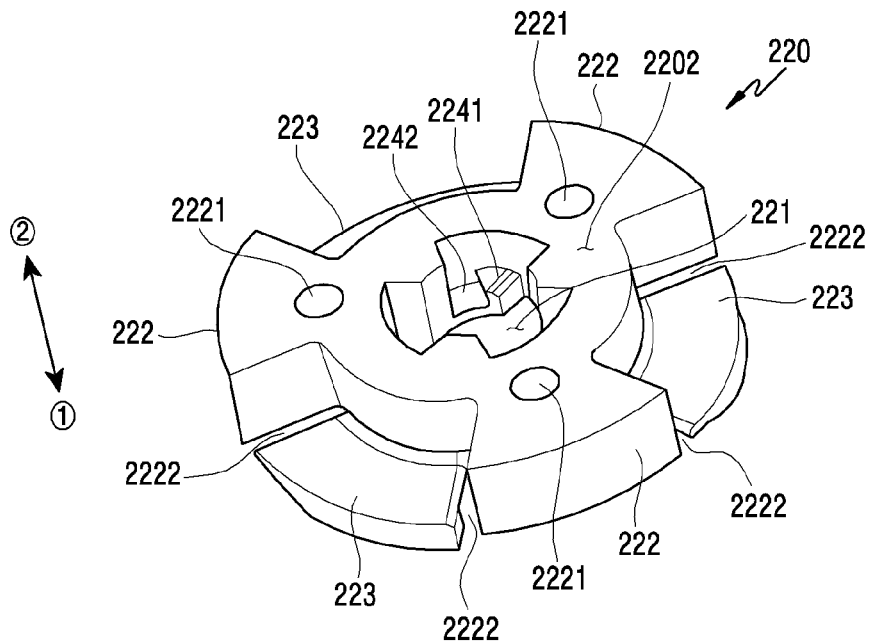
FIGS. 3BA and 3BB illustrate a rear perspective view and a rear view of a construction respectively according to various embodiments of the present disclosure.
Figure 3B:
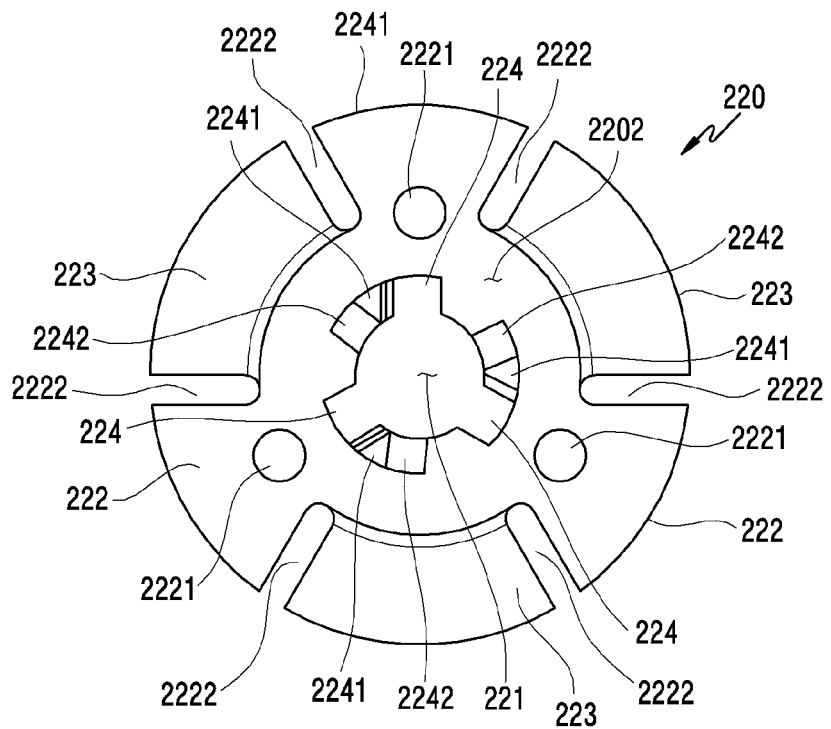

FIGS. 3AA and 3AB illustrate a front perspective view and a front view of a construction respectively according to various embodiments of the present disclosure. FIGS. 3BA and 3BB illustrate a rear perspective view and a rear view of a construction respectively according to various embodiments of the present disclosure.

Referring to FIGS. 3AA, 3AB, 3BA and 3BB, a construction 220 may include a first side 2201 facing a first direction (e.g., a direction ① of FIG. 3AA) and a second side 2202 facing a second direction (e.g., a direction ② of FIG. 3AA) opposite to the first direction. According to an embodiment, the construction 220 may include a shaft inserting hole 221 penetrating from the first side 2201 to the second side 2202 and a plurality of motor fixing unit 222 extended with a specific interval from the shaft inserting hole 221 in a radial direction (in a radius direction). According to an embodiment, the motor fixing unit 222 may be separated from a tension rib 223 to be described below by means of neighboring slits 2222. According to an embodiment, the slits 2222 may induce an elastic deformation of the tension rib 223. According to an embodiment, the motor fixing unit 222 neighboring to one motor fixing unit 222 may be disposed to have the same interval or the same angle. According to an embodiment, the shaft inserting hole 221 may be disposed such that a hub 231 of a propeller (e.g., a propeller 230 of FIG. 4A) to be described below can be penetrated. According to an embodiment, a thickness of the motor fixing unit 222 may be defined as a thickness of the construction 220. According to an embodiment, each motor fixing unit 222 may include a screw through-hole 2221. According to an embodiment, the construction 220 may be fixed in such a manner that a screw (e.g., the screw 240 of FIG. 2) to be inserted to the screw through-hole 2221 of the motor fixing unit 222 is fastened to a screw fastening hole (e.g., the screw fastening hole 2122 of FIG. 2) disposed to an upper side (e.g., the upper side 2121 of FIG. 2) of a motor can (e.g., the motor can 212 of FIG. 2) of a motor (e.g., the motor 210 of FIG. 2).

According to various embodiments, the construction 220 may include the plurality of tension ribs 223 extended at a position spaced apart by a specific interval from the motor fixing unit 222. According to an embodiment, the tension rib 223 may have a narrower thickness than the motor fixing unit 222, and the tension rib 223 may be disposed such that an upper side thereof is aligned with an upper side of the motor fixing unit 222 and the first side 2201. Therefore, when the second side 2202 of the construction 220 is fixed to be in contact with an upper side (e.g., the upper side 2121 of FIG. 2) of a motor can (e.g., the motor can 212 of FIG. 2), the tension rib 223 may be disposed to be spaced apart by a specific interval from the upper side (e.g., the upper side 2121 of FIG. 2) of the motor can (e.g., the motor can 212 of FIG. 2). According to an embodiment, a space spaced apart by a specific interval between the tension rib 223 and the motor can (e.g., the motor can 212 of FIG. 2) may be applied as an elastic deformation space of the tension rib 223. According to an embodiment, the tension rib 223 may include a tension protrusion 2231 extended in a first direction (e.g., a direction ① of FIG. 3AA) at an outermost periphery. According to an embodiment, the tension protrusion 2231 may induce an elastic deformation of the tension rib 223 in a second direction (e.g., a direction of ② in FIG. 3AA) due to a second protrusion (e.g., the second protrusion 2311 of FIG. 4A) of a propeller to be described below (e.g., the propeller 230 of FIG. 4A). According to an embodiment, the tension protrusion 2231 may be disposed to protrude more in the first direction (e.g., the direction ① of FIG. 3AA) than the first side 2201. According to an embodiment, the tension protrusion 2231 may include an inclined portion 2232 capable of inducing an introduction of a second protrusion (e.g., the second protrusion 2311 of FIG. 4A).

According to various embodiments, the construction 220 may be configured such that the plurality of motor fixing units 222 and the plurality of tension ribs 223 are disposed within a trajectory of a circle having a specific radius, about the through-hole shaft inserting hole 221 having a circular cross-section. As illustrated, the construction 220 may include three motor fixing units 222 disposed in a radial direction about the through-hole shaft inserting hole 221 and three tension ribs 223 disposed in a radial direction between the respective motor fixing units 222. According to an embodiment, outermost peripheries of the three motor fixing units 222 and the three tension ribs 223 may have a circular trajectory. According to various embodiments, without being limited thereto, the number of the motor fixing units 222 and the tension ribs 223 may be at least 2 or 4.

According to various embodiments, the shaft inserting hole 221 may include a plurality of protrusion guiding grooves 224 extended from the shaft inserting hole 221 with a specific interval in a radial direction. According to an embodiment, one protrusion guiding groove 224 may be disposed to have the same interval or the same angle with respect to its neighboring protrusion guiding groove 224. According to an embodiment, the protrusion guiding grooves 224 may be disposed at positions corresponding to a plurality of first protrusions (e.g., the first protrusion 2331 of FIG. 4A) protruding from a fixing shaft (e.g., the fixing shaft 233 of FIG. 4A) disposed to a hub (e.g., the hub 231 of FIG. 4A) of a propeller (e.g., the propeller 230 of FIG. 4A). According to an embodiment, each of the plurality of protrusion guiding grooves 224 may include a latching protrusion 2241 disposed therein and a latching groove 2242 extended from the latching protrusion 2241. According to an embodiment, the latching protrusion 2241 and the latching groove 2242 may be disposed in the same direction as a circumferential direction of the shaft inserting hole 221. According to an embodiment, the latching protrusion 2241 may allow a first protrusion (e.g., the first protrusion 2331 of FIG. 4A) protruding from a fixing shaft (e.g., the fixing shaft 233 of FIG. 4A) to be caught first when the hub (e.g., the hub 231 of FIG. 4A) of the propeller (e.g., the propeller 230 of FIG. 4A) accommodated in the shaft inserting hole 221 rotates for the purpose of fastening. According to an embodiment, the latching groove 2242 may accommodate the first protrusion (e.g., the first protrusion 2331 of FIG. 4A) in such a manner that the first protrusion (e.g., the first protrusion 2331 of FIG. 4A) protruding from the fixing shaft (e.g., the fixing shaft 233 of FIG. 4A) is caught first at the latching protrusion 2241 and then moves over the latching protrusion 2241 when the hub (e.g., the hub 231 of FIG. 4A) of the propeller (e.g., the propeller 230 of FIG. 4A) accommodated in the shaft inserting hole 221 rotates for the purpose of fastening. According to an embodiment, in a state where the first protrusion (e.g., the first protrusion 2331 of FIG. 4A) is accommodated in the latching groove 2242, the latching groove 2242 may serve to interrupt the first protrusion (e.g., the first protrusion 2331 of FIG. 4A) to prevent it from being deviated from the latching groove 2242 when the propeller (e.g., the propeller 230 of FIG. 4A) rotates.

FIGS. 3CA and 3CB illustrate an operation of a tension rib when external force of a construction is applied according to various embodiments of the present disclosure.

Figure 4A:
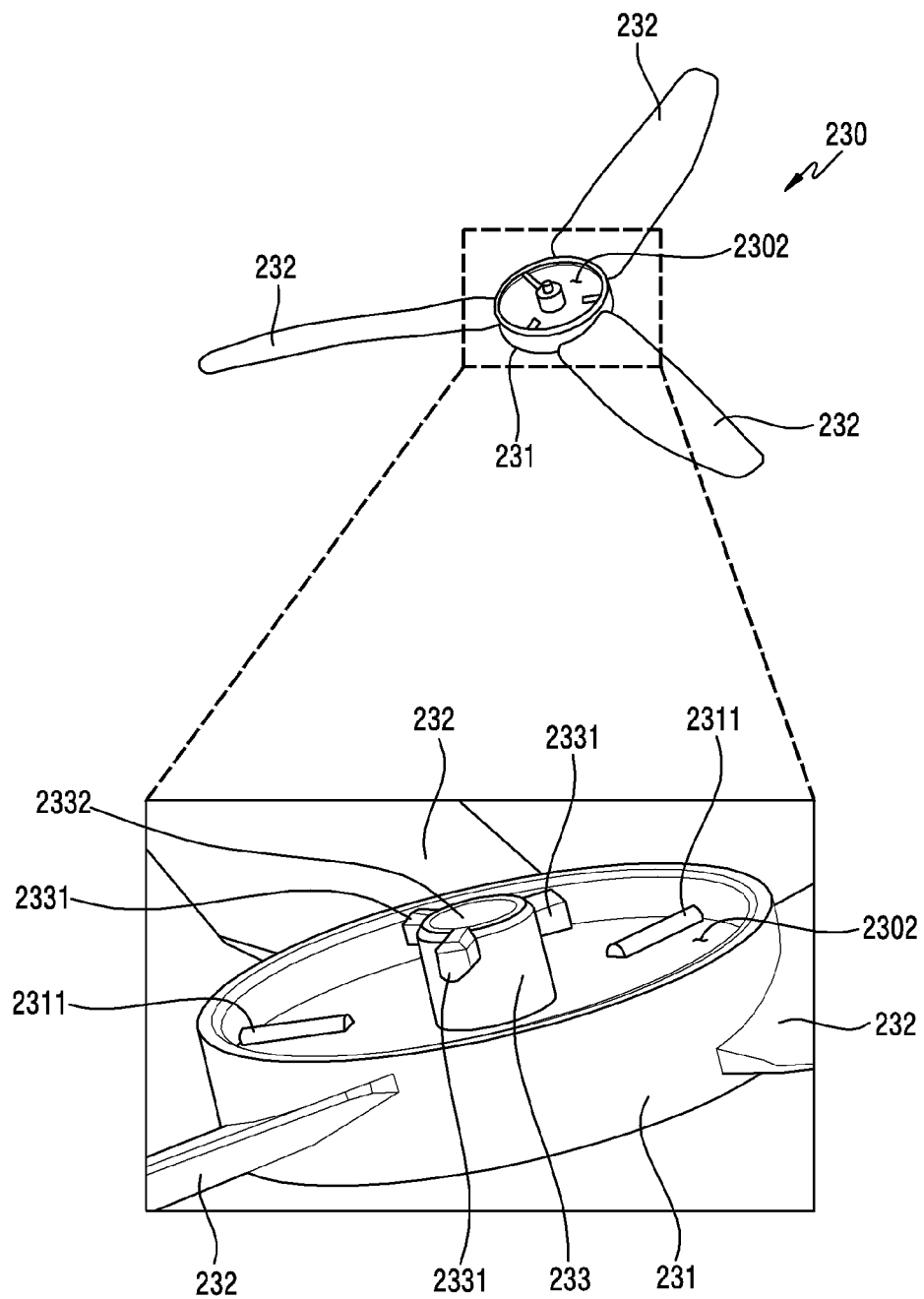
FIGS. 4A and 4B illustrate a front perspective view and a front view of a propeller according to various embodiments of the present disclosure.

Referring to FIGS. 3CA and 3CB, when a tension rib 223 of a construction 220 is attached to a propeller (e.g., a propeller 230 of FIG. 4A) for the purpose of fastening, an elastic deformation may be induced in a second direction (e.g., a direction ② of FIGS. 3CA and 3CB) by a second protrusion (e.g., a second protrusion 2311 of FIG. 4A) disposed to a hub (e.g., a hub 231 of FIG. 4A) of a propeller (e.g., the propeller 230 of FIG. 4A). According to an embodiment, the elastic deformation of the tension rib 223 guides the hub (e.g., the hub 231 of FIG. 4A) in a second direction (e.g., the direction ② of FIGS. 3CA and 3CB) by a specific movement distance when the propeller (e.g., the propeller 230 of FIG. 4A) is fastened, and thus the first protrusion (e.g., a first protrusion 2331 of FIG. 4A) disposed to the fixing shaft (e.g., the fixing shaft 233 of FIG. 4A) is induced to be placed to a latching groove 2242 by moving over a latching protrusion 2241 disposed to a protrusion guiding groove 224. According to an embodiment, when the first protrusion (e.g., the first protrusion 2331 of FIG. 4B) is caught by the latching groove 2242, the tension rib 223 may be restored back to an original state due to an extra space of the latching groove 2242.

According to various embodiments, the tension rib 223 may undergo an elastic deformation by slits 2222 as well as by its own thickness. According to an embodiment, the tension rib 223 may undergo an elastic deformation with respect to a virtual line of one portion at an outer periphery with respect to the slit 2222.

Figure 4B:
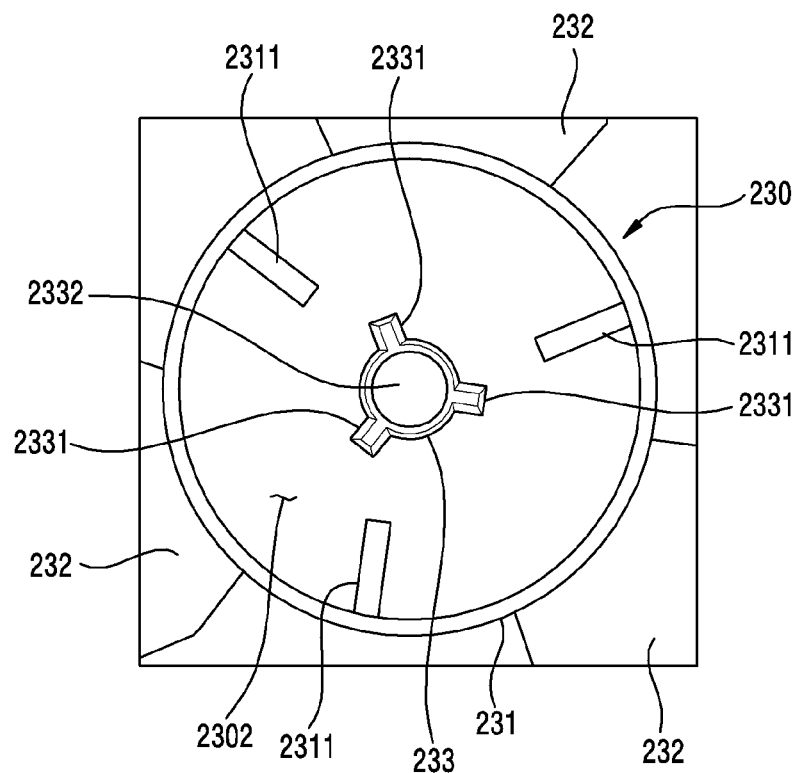

FIG. 4A and FIG. 4B illustrate a front perspective view and a front view of a propeller according to various embodiments of the present disclosure.

Referring to FIG. 4A and FIG. 4B, a propeller 230 may include a hub 231 having a circular shape and a plurality of blades 232 disposed with the same interval or the same angle in a radial direction from an outer circumferential surface of the hub 231. According to an embodiment, the hub 231 may include a second side 2302 disposed in a direction facing a first side (e.g., the first side 2301 of FIG. 2) and configured to face a first side (e.g., a first side 2201 of FIGS. 3AA and 3AB) of a construction (e.g., the construction 220 of FIGS. 3AA and 3AB). According to an embodiment, the hub 231 may include a fixing shaft 233 protruding by a specific height in an upward direction with respect to a center of the second side 2302. According to an embodiment, the fixing shaft 233 may include a plurality of first protrusions 2331 protruding in a radial direction. According to an embodiment, the plurality of first protrusions 2331 may be disposed to have the same interval or the same angle. According to an embodiment, the first protrusion 2331 may be inserted to a protrusion guiding groove (e.g., the protrusion guiding groove 224 of FIGS. 3AA and 3AB) of a construction (e.g., the construction 220 of FIGS. 3AA and 3AB) when the propeller 230 is coupled to the construction (e.g., the construction 220 of FIGS. 3AA and 3AB).

According to various embodiments, the hub 231 may include a plurality of second protrusions 2311 protruding in an upward direction from the second side 2302. According to an embodiment, the second protrusion 2311 may be disposed to have the same interval or the same angle in a radial direction. According to an embodiment, the second protrusion 2311 may be disposed at a position capable of interfering a tension rib (e.g., the tension rib 223 of FIGS. 3AA and 3AB) by a rotation during the propeller 230 is coupled to the construction (e.g., the construction 220 of FIGS. 3AA and 3AB). According to an embodiment, the second protrusion 2311 may be disposed to have a length in a radial direction to secure interference reliability. According to an embodiment, a side which is in contact with a tension rib (e.g., the tension rib 223 of FIGS. 3AA and 3AB) of the second protrusion 2311 may have a curved shape having a specific curvature to reduce frictional force with respect to the tension rib (e.g., the tension rib of FIGS. 3AA and 3B). According to an embodiment, the number of the first protrusions 2331 and second protrusions 2311 may correspond to the number of protrusion guiding grooves (e.g., the protrusion guiding groove 224 of FIGS. 3AA and 3AB) and tension ribs (e.g., the tension rib 223 of FIGS. 3AA and 3AB) disposed to a construction (e.g., the construction 220 of FIGS. 3AA and 3AB).

According to various embodiments, a plurality of motor fixing units 222 and tension ribs 223 of the construction 220 and the plurality of first protrusions 2331 and second protrusions 2311 of the propeller 230 coupled thereto are disposed to have the same angle and/or interval. Therefore, when the propeller 230 is mounted to the construction 220, it can be easily coupled regardless of an insertion direction without being inserted in a specific direction.

Figure 5:
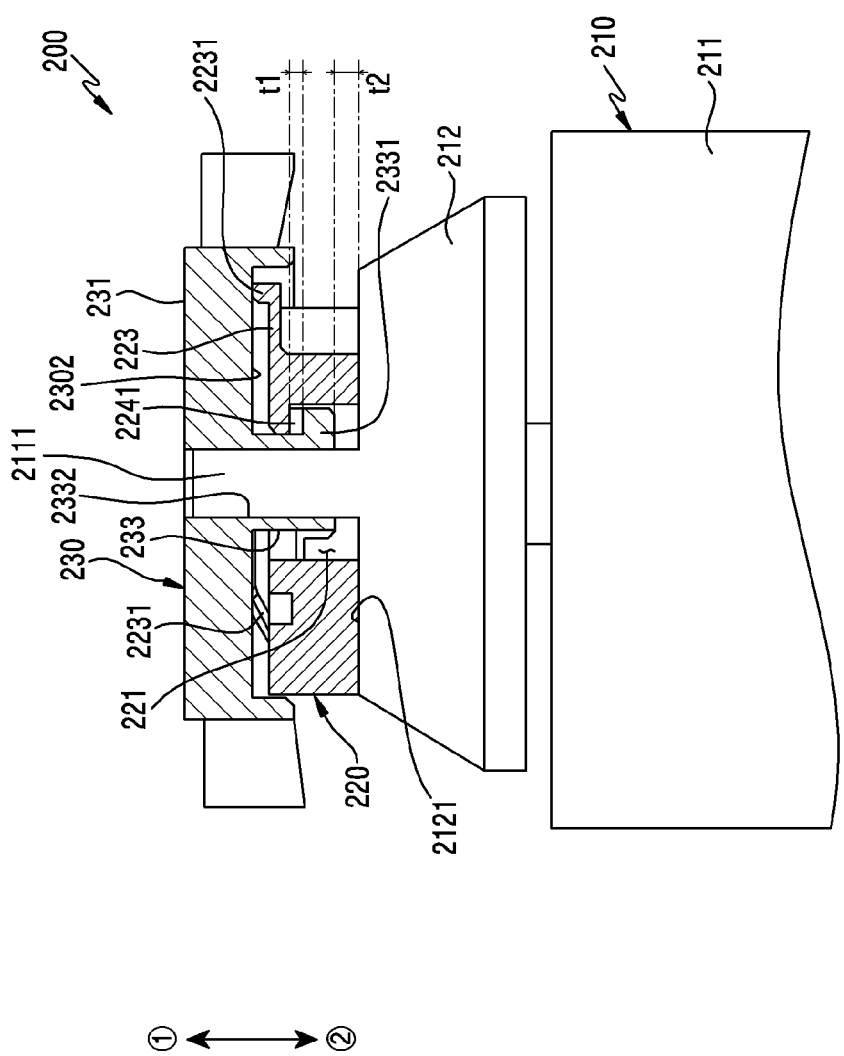
FIG. 5 illustrates a cross-sectional view of a propulsion system according to various embodiments of the present disclosure.

FIG. 5 illustrates a cross-sectional view of a propulsion system according to various embodiments of the present disclosure.

A propulsion system 200 of FIG. 5 may be at least partially similar to the propulsion system 120 of FIG. 1, or may include other embodiments of the propulsion system.

Referring to FIG. 5, the propulsion system 200 may include a motor 210, a construction 220 coupled to the motor 210, and a propeller 230 coupled to the construction 220. According to an embodiment, the motor 210 may include a motor can 212 installed rotatably in a motor main body 211. According to an embodiment, the construction 220 may be fixed at an upper side 2121 of the motor can 212 through a plurality of screws (e.g., the screw 240 of FIG. 2) which pass through the construction 220. According to an embodiment, the propeller 230 is fastened at an upper portion of the construction 220, and may maintain a state of being firmly fixed to the construction 220 when an intentional disassembling operation of an operator is not applied after being fastened.

According to various embodiments, a fixing shaft 233 disposed to a hub 231 of the propeller 230 may be inserted to a shaft inserting hole 221 disposed to the construction 220. In this case, a first protrusion 2331 of the fixing shaft 233 may be located in proximity to a latching groove 2242 of the construction 220. A tension protrusion 2231 of a tension rib 223 may be in contact with the second side 2302 of the hub 231, and a second protrusion (e.g., the second protrusion 2311 of FIG. 4A) of the hub 231 may be located in proximity to the tension rib 223. According to an embodiment, in this state, the propeller 230 is in a state of being detachable from the construction 220, and may be firmly fixed to the construction 220 by a pressing and rotation operation to be described below.

According to various embodiments, a length of the fixing shaft 233 may be properly adjusted to prevent a damage of the propeller 230 or the tension rib 223 of the construction 220 by excessive pressure when the propeller 230 is fixed to the construction 220. According to an embodiment, the length of the fixing shaft 233 may be defined by considering a stroke space t1 of the hub 231 so as to be unlatched at the first protrusion 2331 and a margin space t2 so as to prevent excessive movement of the fixing shaft 233 due to overpressure, in a state where the fixing shaft 233 is completely inserted to the shaft inserting hole 221 of the construction 220. For example, the length of the fixing shaft 233 may be defined such that rotation-based locking is released when the propeller 230 is pressed by about 0.7 mm, and an end portion of the fixing shaft 233 is in contact with the upper side 2121 of the motor can 212 when it is pressed by about 1.2 mm, thereby preventing overpressure.

According to various embodiments, the margin space t2 may be disposed to be equal to or at least greater than the stroke space t1 of the hub 231, thereby accommodating an operating range based on a stroke of the hub 231.

FIGS. 6A, 6B, 6C, 6D, 6E and 6F illustrate a coupling process of a propulsion system according to various embodiments of the present disclosure.

Referring to FIGS. 6A, 6B, 6C, 6D, 6E and 6F, as shown in FIGS. 6A, 6B and 6C, a construction 220 may be fixed to a motor can 212 rotatably disposed to a motor 210 by using a plurality of screws 240. According to an embodiment, when the motor can 212 and the construction 220 are constructed integrally, the separate screw 240 may be excluded. Thereafter, as shown in FIG. 6D, a propeller 230 may be assembled to a construction fixed to the motor 210. According to an embodiment, as shown in FIGS. 6E and 6F, when the propeller 230 is temporarily assembled to the construction 220, and then the propeller 230 is pressed along an axis A and rotates by a specific rotation amount in a specific direction (e.g., a clockwise or counterclockwise direction), the propeller 230 may be fixed so as not to be randomly detached from the construction 220.

Hereinafter, an operation of mounting the propeller 230 will be described in detail.

FIGS. 7AA, 7AB, 7AC, 7BA, 7BB, 7BC, 7CA, 7CB, 7CC, 7DA, 7DB, 7DC, 7EA, 7EB and 7EC illustrate an operation for mounting a propeller to a construction of a propulsion system according to various embodiments of the present disclosure.

Each drawing illustrates locations of first and second protrusions according to a rotation of a propeller about a construction, and illustrates a plan view, a rear view, and a lateral view, in that order.

FIGS. 7AA, 7AB and 7AC illustrate a state where a fixing shaft 233 of a propeller 230 is inserted to a shaft inserting hole 221 of a construction 220. A first protrusion 2331 of the fixing shaft 233 may be located in proximity to a latching protrusion 2241 of the construction 220, and a second protrusion 2311 of the fixing shaft 233 may be located in proximity to the tension rib 223.

Figure 7B:
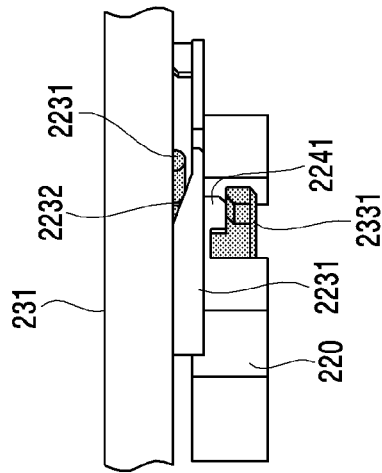
FIGS. 7AA, 7AB, 7AC, 7BA, 7BB, 7BC, 7CA, 7CB, 7CC, 7DA, 7DB, 7DC, 7EA, 7EB and 7EC illustrate an operation for mounting a propeller to a construction of a propulsion system according to various embodiments of the present disclosure.
Figure 7B:
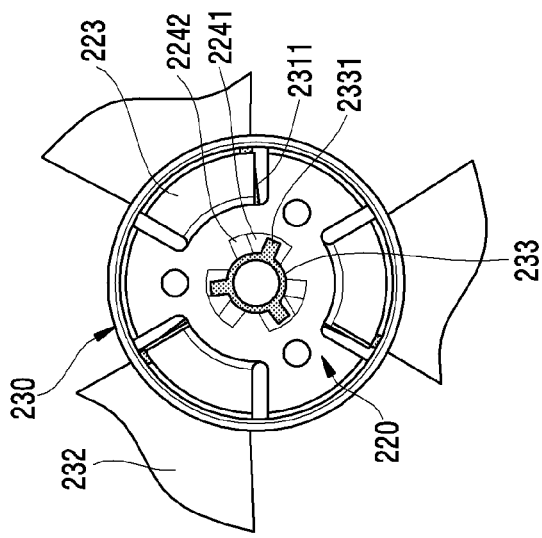
Figure 7B:
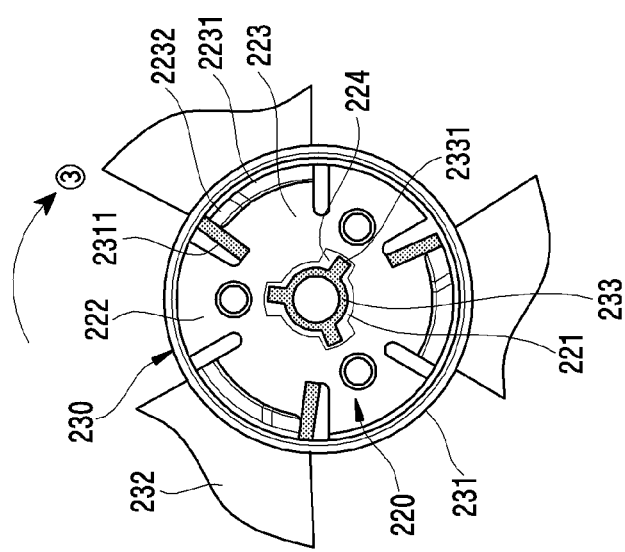

FIGS. 7BA, 7BB and 7BC illustrate a state where the propeller 230 rotates by a specific rotation amount (e.g., a rotation by 7 degrees) in a clockwise direction (e.g., a direction ③ of FIG. 7BA) at an upper portion of the construction 220. In this case, the first protrusion 2331 of the fixing shaft 233 may be in contact with or located in proximity to the latching protrusion 2241 of the construction 220. The second protrusion 2311 may be located immediately before being introduced to an inclined portion 2232 in proximity to a tension protrusion 2231 of the tension rib 223.

FIGS. 7CA, 7CB and 7CC illustrate a state where the propeller 230 rotates by a specific rotation amount (e.g., a rotation by 14 degrees) in a clockwise direction (e.g., a direction ③ of FIG. 7CA) at an upper portion of the construction 220. In this case, the first protrusion 2331 of the fixing shaft 233 may still be in contact with or located in proximity to the latching protrusion 2241 of the construction 220. The second protrusion 2311 may be introduced by being in contact with the inclined portion 2232 in proximity to the tension protrusion 2231.

Figure 7D:
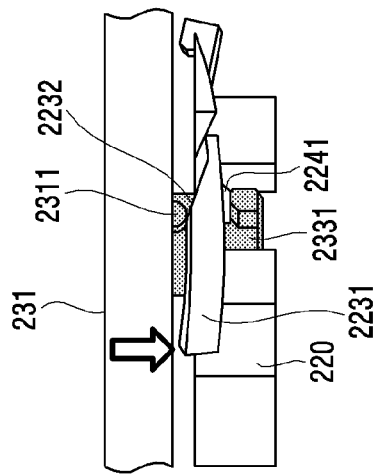
Figure 7D:
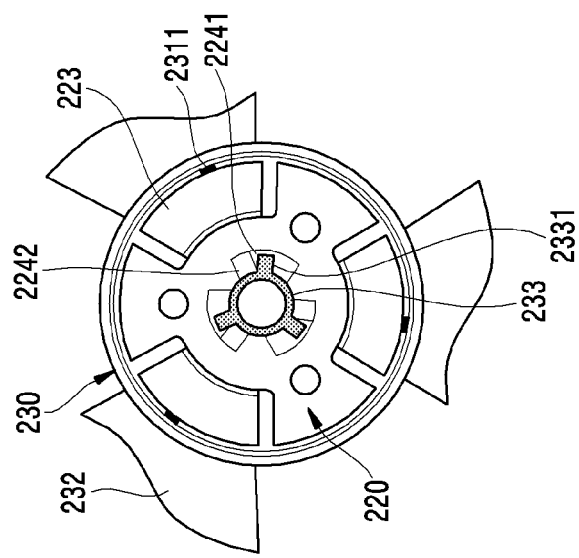
Figure 7D:
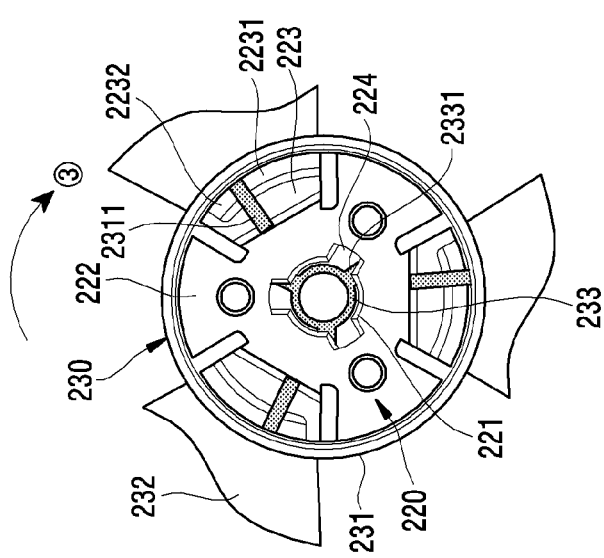

FIGS. 7DA, 7DB, 7DC and 7DD illustrate a state where the propeller 230 rotates by a specific rotation amount (e.g., a rotation by 25 degrees) in a clockwise direction (e.g., a direction ③ of FIG. 7DA) at an upper portion of the construction 220. In this case, the second protrusion 2311 may move along the inclined portion 2232 and thus press the tension protrusion 2231 in an arrow direction to guide it to a state of being curved downwards. At the same time, the first protrusion 2331 of the fixing shaft 233 may be located in a state of moving over the latching protrusion 2241.

Figure 7E:
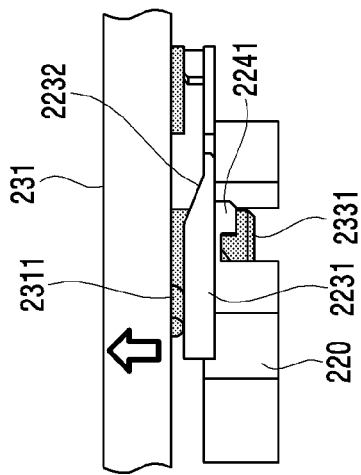
Figure 7E:
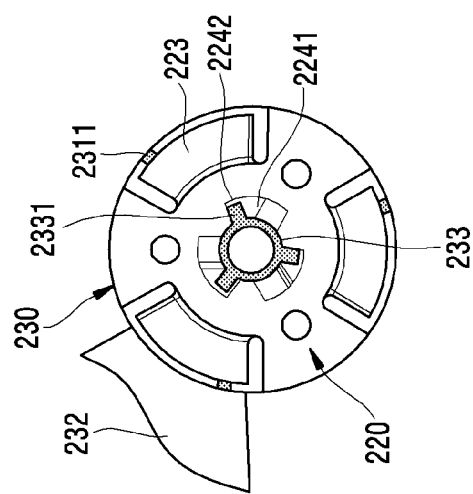
Figure 7E:
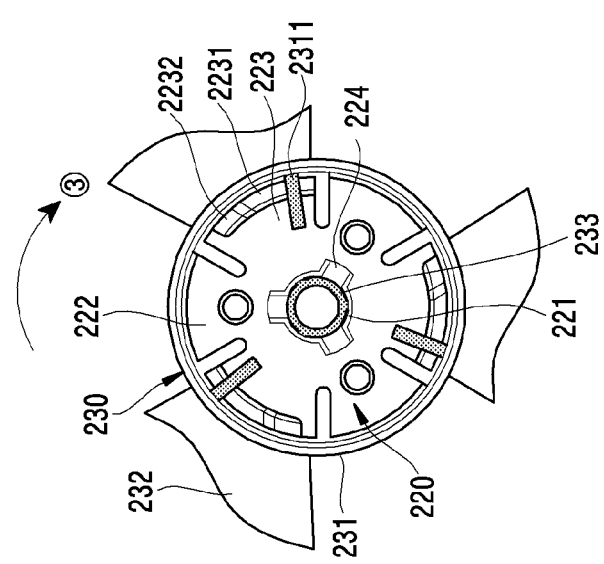

FIGS. 7EA, 7EB and 7EC illustrate a state where the propeller 230 fully rotates in a clockwise direction (e.g., a direction ③ of FIG. 7EA) at an upper portion of the construction 220, thereby completing fastening. In this case, when the propeller 230 is released from the pressure, the tension protrusion 2231 of the tension rib 223 may be restored to an original state while maintaining a state of being in contact with the second protrusion 2311. As a result, the first protrusion 2331 may be located to a state of being mounted to a latching groove (e.g., the latching groove 2242 of FIGS. 3BA and 3BB) of the construction 220. Therefore, the first protrusion 2331 is prevented from being mounted to the latching groove (e.g., the latching groove 2242 of FIGS. 3BA and 3BB) and from rotating randomly in a reverse direction by the latching protrusion 2241. As a result, the propeller 230 may be firmly fixed to the construction 220.

According to various embodiments, the propeller 230 is allowed to reservedly rotate in a reverse order in the state of FIGS. 7EA, 7EB and 7EC, and thus the first protrusion 2331 is unlatched from the latching groove (e.g., the latching groove 2242 of FIGS. 3BA and 3BB), thereby detaching the propeller 230 from the construction 220.

Although a propeller assembly structure according to various embodiments of the present disclosure is applied to a propulsion system of an unmanned aerial vehicle, the present disclosure is not limited thereto. For example, it is also applicable to a stationary body and a typical fixing structure for fixing a moving body which moves in the stationary body. In addition, an assembly structure of a propeller and a construction according to exemplary embodiments of the present disclosure may also be applied to mutually combine first and second stationary bodies.

Various embodiments of the present disclosure can replace a propeller without a separate replacement tool, and can prevent a coupling structure against rigidity deterioration even after being fastened.

Figure 8:
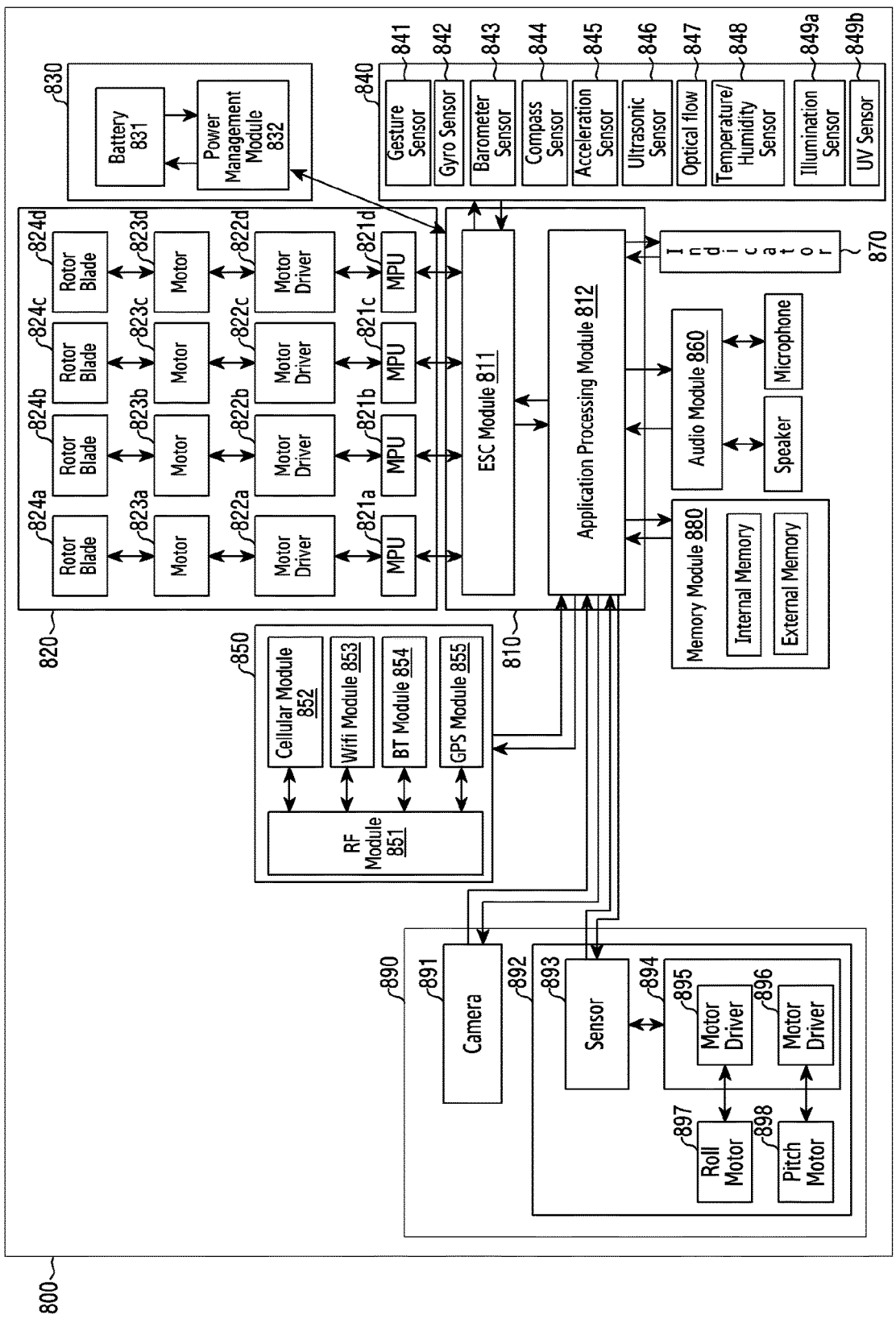
FIG. 8 illustrates a block diagram of an unmanned aerial vehicle according to various embodiments of the present disclosure.

FIG. 8 illustrates a block diagram of an unmanned aerial vehicle according to various embodiments of the present disclosure.

An unmanned aerial vehicle 800 of FIG. 8 may be at least partially similar to the unmanned aerial vehicle of FIG. 1, or may include other embodiments of the unmanned aerial vehicle.

Referring to FIG. 8, an unmanned aerial vehicle 800 may include a processor 810, a movement module 820, a battery module 830, a sensor module 840, a communication module 850, an audio module 860, an indicator 870, a memory module 880 and/or a camera module 890.

The processor 810 may include at least an Electronic Speed Control (ESC) (or a movement control module) 811 and an application processing module 812. The processor 810 may perform computations or data processing, for example, for control and/or communication of at least one different constitutional elements of the unmanned aerial vehicle 800.

The ESC module 811 may control a movement of the unmanned aerial vehicle 800 by using position and posture information of the unmanned aerial vehicle 800 or an operating signal of a controller. In addition, the ESC module 811 may include a flight control module and a posture control module. The flight control module may control a roll, pitch, yaw, throttle, or the like of the unmanned aerial vehicle 800 on the basis of the position and posture information acquired in the posture control module and the operating signal of the controller. The ESC module 811 may control a hovering operation, and may allow the unmanned aerial vehicle 800 to fly to up to a target point on the basis of position information provided by the application processing module 812 and the operating signal of the controller.

The application processing module 812 may receive state information of the unmanned aerial vehicle 800 and provide it to the controller. Alternatively, the state information of the unmanned aerial vehicle 800 may be informed to a user under the control of the audio module 860 or a display unit or the like. In addition, when a camera device is mounted, an automatic image capturing mode may be controlled based on received image capturing information. The image capturing information may include image capturing position information. The image capturing information may include composition information and/or camera control information in addition to the image capturing position information. The image capturing information may be image capturing information based on user preference in the electronic device. The application processing module 812 may transfer the image capturing position information to the ESC module 811 to control a movement of the unmanned aerial vehicle 800. The application processing module 812 may transfer driving and/or camera control information to the camera device to control an image capturing composition and angle of a camera and a subject.

When the unmanned aerial vehicle 800 is a quad-rotor, the movement module 820 (or a propulsion system) may include Micro Processor Units (MPUs) 821*a* to 821*d*, motor driver circuits 822*a* to 822*d*, motors 823*a* to 823*d*, and rotor blades 824*a* to 824*d*. The MPUs 821*a* to 821*d* may output control data for rotating the respective corresponding rotary blades 824*a* to 824*d* on the basis of an operating signal output from the ESC module 811. The motor driving units 822*a* to 822*d* may output motor control data output from the MPUs 821*a* to 821*d* by converting it to a driving signal. The motors 823*a* to 823*d* may control a rotation of the corresponding rotor blades 824*a* to 824*d* on the basis of a driving signal of the respective corresponding motor drivers 822*a* to 822*d*.

The battery module 830 may include a battery 831 and a power management module 832. The power management module 832 may supply power, for example, to the unmanned aerial vehicle 800 and manage the supplied power. According to various embodiments, the power management module 832 may include a Power Management Integrated Circuit (PMIC), a charging IC, or a battery gauge. The PMIC may have a wired charging type and/or a wireless charging type. The wireless charging type may include, for example, a magnetic resonance type, a magnetic induction type, and an electromagnetic type, and may further include an additional circuit for wireless charging, for example, a coil loop, a resonant circuit, a rectifier, or the like. The battery gauge may measure, for example, remaining capacity of the battery and a voltage, current, or temperature during charging. The battery 831 may include, for example, a rechargeable battery and/or a solar battery.

According to various embodiments, the battery module 830 may be electrically/physically coupled to processor 810 to supply power. For example, the battery module 830 may be electrically/physically coupled to the ESC module 811 of the processor 810. The electrical/physical connection may be configured to be coupled or separated by a sliding operation of a housing (e.g., the housing 110 of FIG. 1). The power supply/cut-off mechanism may prevent unnecessary power consumption of the unmanned aerial vehicle 800 and a safety accident caused by an unintentional operation of the unmanned aerial vehicle 800, which may occur in case of regular power supplying.

The sensor module 840 may include some or all of a gesture sensor 841 capable of sensing a motion and/or gesture of a subject, a gyro sensor 842 capable of measuring angular velocity of the unmanned aerial vehicle 100 in flight, a barometer 843 capable of measuring a pressure change in the air and/or atmospheric pressure, a geomagnetic sensor (terrestrial magnetism sensor, compass sensor) 844 capable of measuring a magnetic field of the Earth, an acceleration sensor 845 for measuring acceleration of the unmanned aerial vehicle 800 in flight, an ultrasonic sensor 846 capable of outputting an ultrasonic wave to measure a distance by measuring a signal reflected from an object, an optical flow 847 capable of calculating a location by recognizing a ground terrain or pattern by the use of a camera module, a temperature-humidity sensor 848 capable of measuring temperature and humidity, an illumination sensor 849*a* capable of measuring illumination, and an Ultra Violet (UV) sensor 849*b* capable of measuring an ultra violet ray.

According to various embodiments of the present disclosure, the sensor module 840 may measure a distance between the unmanned aerial vehicle 800 and a ground surface. A sensor for measuring the distance between the unmanned aerial vehicle 800 and the ground surface may be the ultrasonic sensor 846 or the optical flow 847. The ultrasonic sensor 846 may output an ultrasonic save and measure the distance from the ground surface by outputting an ultrasonic wave reflected from the ground surface. The optical flow 847 may recognize a bottom terrain or pattern by using an image capturing device such as a camera or the like to measure a distance to the ground surface from the unmanned aerial vehicle 800.

According to various embodiments of the present disclosure, the communication module 850 may include at least one of a wireless communication module and a wired communication module. The communication module 850 may include an RF module 851, a cellular module 852, a WiFi module 853, a Bluetooth module 854, and a GPS module 855.

According to various embodiments of the present disclosure, the GPS module 855 may output location information such as longitude, latitude, altitude, GPS speed, GPS heading, or the like of the unmanned aerial vehicle 800 during the movement of the unmanned aerial vehicle 800. The location information may be calculated by measuring an accurate time and distance through the GPS module. The GPS module 855 may acquire not only the latitude, longitude, and altitude locations but also the accurate time together with three-dimensional velocity information.

The communication module 850 may perform communication for receiving a movement operating signal of another electronic device (e.g., a controller) and the unmanned aerial vehicle 800 or transmitting location information for acquiring a real-time movement state. According to various embodiments, the communication module 850 may transmit an image captured in the unmanned aerial vehicle 800 and capturing information to an external electronic device such as the controller or the like.

The audio module 860 may bilaterally convert, for example, sound and electric signals. The audio module 860 may process sound information which is input or output through, for example, a speaker, a receiver, an earphone, a microphone, or the like.

The indicator 870 may indicate a particular state of the unmanned aerial vehicle 800 or a portion thereof (e.g., the processor 810), such as a booting state, a message state, a charging state, or the like.

The memory module 880 may include an internal memory and an external memory. A related command or data may be stored in at least one different constitutional element of the unmanned aerial vehicle 800. The memory module 880 may store a software and/or a program. The program may include a kernel, a middleware, an Application Programming Interface (API), and/or an application program (or an "application") or the like.

The camera module 890 (or an image capturing device) may include a camera 891 and/or a gimbal 892. The gimbal

892 may include a gimbal controller 894, a gyro/acceleration sensor 893, motor drivers 895 and 896, and/or motors 897 and 898.

Although not shown, the camera module 890 may include a lens, an image sensor, an image signal processor, a camera controller, or the like. The lens may perform a focusing function by using a property of straightness and refraction of light and a function of zooming in/out a subject. The image sensor may have a structure of a CMOS image sensor, a CIS, or a Charge Coupled Device (CCD).

The image processing unit may include an image pre-processing unit for performing operations such as Auto White Balance (AWB), Auto Exposure (AE), Auto Focusing (AF) extraction and processing, lens shading correction, or the like and an image post-processing unit which performs color interpolation, color interpolation, Image Processing Chain (IPC), color conversion, or the like. In addition, the image processing unit may include an encoder capable of encoding processed images and a decoder capable of decoding encoded images.

The camera controller may adjust a composition and/or a camera angle (a capturing angle) with respect to a subject by adjusting up/down/left/fight angles of a lens on the basis of composition information and/or camera control information which is output from the processor 810.

The gimbal 892 may control an inclination of the camera 891 so that the camera 891 maintains its posture regardless of a movement of the unmanned aerial vehicle 800. The gimbal 892 may include a sensor 893 for controlling the inclination, a gimbal controller 894, and motor drivers 895 and 896.

According to various embodiments of the present disclosure, an unmanned aerial vehicle may include a housing, a wireless communication circuit disposed inside the housing or coupled to the housing, and configured to be coupled with an external controller through wireless communication, a plurality of propulsion systems coupled to or at least partially inserted to the housing, and a navigation circuit configured to control the plurality of propulsion systems.

At least one of the plurality of propulsion systems may include a motor controlled by the navigation circuit, a construction disposed to the motor and including a first side, a second side facing the motor in a direction opposite to the first side, a shaft inserting hole disposed to the second side, and a latching protrusion and a latching groove which are extended sequentially inside the shaft inserting hole, and a propeller fastened to the construction.

The propeller may include a hub coupled to a first side of the construction, a fixing shaft which protrudes in a direction of the construction on a side facing the construction of the cylindrical hub and is inserted to the shaft inserting hole of the construction, and at least one protrusion which protrudes on an outer circumferential surface of the fixing shaft and is mounted to the latching groove by moving over the latching protrusion.

According to various embodiments, the construction may include at least one protrusion guiding groove disposed in a radial direction from the shaft inserting hole. A first protrusion of the fixing shaft may be inserted to the protrusion guiding groove.

According to various embodiments, the latching protrusion and the latching groove may be extended in a circumferential direction within the protrusion guiding groove.

According to various embodiments, the protrusion guiding groove and the first protrusion may be disposed at least in pair, and one protrusion guiding groove and first protrusion may be disposed to have the same interval or the same angle with respect to a neighboring protrusion guiding groove and first protrusion.

According to various embodiments, the construction may be fixed to an upper side of a motor can to be rotatably mounted to the motor, or disposed integrally with respect to the motor can.

According to various embodiments, the shaft inserting hole may be disposed in a penetration manner from the first side to second side of the construction.

According to various embodiments, the construction may further include a stopping member to interrupt a detachment of the first protrusion mounted to the latching groove.

According to various embodiments, the stopping member may include at least one tension rib extended in a radial direction from the shaft inserting hole of the construction in an elastically deformable manner by a plurality of slits, and a tension protrusion extended from the tension rib in a direction opposite to the motor. The tension protrusion may press a surface of the hub in the direction opposite to the motor to prevent a detachment, in a state where a latching protrusion is mounted to the latching groove.

According to various embodiments, the unmanned aerial vehicle may include at least one second protrusion which protrudes on a surface of the hub, and which presses the tension rib in the direction opposite to the motor by being in contact with the tension protrusion.

According to various embodiments, when the tension rib is pressed in a direction of the motor while the hub of the propeller rotates in a direction of being fastened to the construction, an elastic deformation may occur in the direction of the motor due to the second protrusion.

According to various embodiments, the tension rib may be restored to an original state by being supported by the second protrusion when maintaining a state where the hub of the propeller is fully fastened.

According to various embodiments, the tension protrusion further may include an inclined portion for inducing an introduction of the second protrusion.

According to various embodiments, the tension rib and the second protrusion may be disposed at least in pair, and one tension rib and second protrusion may be disposed to have the same interval or the same angle with respect to a neighboring tension rib and second protrusion.

According to various embodiments, a protrusion length of the fixing shaft may be defined within a range of restoring an elastic deformation of the tension rib.

According to various embodiments, overpressure may be prevented in such a manner that the fixing shaft penetrates the shaft inserting hole of the construction and is in contact with the motor by pressure.

According to various embodiments, the unmanned aerial vehicle may further include an image processing device.

According to various embodiments, a coupling structure of constructions may include a first construction including a first side, a second side disposed in a direction facing the first side, an inserting hole disposed to the second side, and a latching protrusion and a latching groove which are extended sequentially inside the inserting hole, and a second construction including a fixing shaft, which protrudes in a direction of the first construction on a side facing the first construction and is inserted to the inserting hole of the first construction, and at least one first protrusion, which protrudes on an outer circumferential surface of the fixing shaft and is mounted to the latching groove by moving over the latching protrusion. When the second construction rotates with a specific rotation amount with respect to the first construction, the first protrusion may be interrupted by the latching groove so that the first construction is fixed to the second construction.

According to various embodiments, the coupling structure may further include at least one tension rib extended in a radial direction from the inserting hole of the first construction in an elastically deformable manner by a plurality of slits, and a tension protrusion extended from the tension rib in a direction of the second construction. The tension protrusion may press a corresponding side of the second construction to prevent a detachment, in a state where a latching protrusion is mounted to the latching groove.

According to various embodiments, the coupling structure may further include at least one second protrusion which protrudes on the corresponding side of the second construction, and presses the tension by being in contact with the tension protrusion.

According to various embodiments, when the tension rib is pressed in a direction of the first construction while rotating in a direction of being fastened to the second construction, an elastic deformation may occur due to the second protrusion.

Various exemplary embodiments of the present disclosure disclosed in the specification and the drawing are merely a specific example presented for clarity and are not intended to limit the scope of the present disclosure. Therefore, in addition to the embodiments disclosed herein, various changes in forms and details made without departing from the technical concept of the present disclosure will be construed as being included in the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An unmanned aerial vehicle comprising:
   a housing;
   a wireless communication circuit disposed inside the housing or coupled to the housing, and configured to be coupled with an external controller through wireless communication;
   a processor configured to control a plurality of propulsion systems; and
   the plurality of propulsion systems are coupled to or at least partially inserted into the housing, wherein at least one of the plurality of propulsion systems comprises:
      a motor controlled by the processor,
      a construction disposed to the motor and comprising a first side, a second side facing the motor in a direction opposite to the first side, a shaft inserting hole disposed to the second side, and a latching protrusion and a latching groove disposed inside the shaft inserting hole, and
      a propeller fastened to the construction, wherein the propeller comprises:
         a hub coupled to the first side of the construction,
         a fixing shaft that protrudes from the hub in a direction towards the construction and is received within the shaft inserting hole of the construction, and
         at least one protrusion that protrudes from an outer circumferential surface of the fixing shaft towards an external perimeter of the hub and is mounted to the latching groove by rotational movement of the latching protrusion,
      wherein the construction comprises:
         at least one tension rib extended in a radial direction from the shaft inserting hole of the construction in an elastically deformable manner by a plurality of slits, and
         a tension protrusion extended from the at least one tension rib in a direction opposite to the motor, wherein the tension protrusion presses a surface of the hub in the direction opposite to the motor to prevent detachment.

2. The unmanned aerial vehicle of claim 1, wherein:
   the shaft inserting hole includes at least one protrusion guiding groove extending in the radial direction, and
   a first protrusion, of the at least one protrusion of the fixing shaft, is received within a first protrusion guiding groove of the at least one protrusion guiding groove during coupling of the hub to the construction.

3. The unmanned aerial vehicle of claim 2, wherein the latching protrusion extends in a circumferential direction within the first protrusion guiding groove.

4. The unmanned aerial vehicle of claim 2, wherein each of the at least one protrusion guiding groove corresponds to one of the at least one protrusion, respectively.

5. The unmanned aerial vehicle of claim 1, wherein the construction is fixed to an upper side of a motor can of the motor and is rotatably mounted to the motor, or disposed integrally with respect to the motor can.

6. The unmanned aerial vehicle of claim 1, wherein the shaft inserting hole is disposed in a penetration manner from the first side to the second side of the construction.

7. The unmanned aerial vehicle of claim 1, further comprising at least one second protrusion that protrudes on the surface of the hub, and presses the at least one tension rib in the direction opposite to the motor by being in contact with the tension protrusion.

8. The unmanned aerial vehicle of claim 7, wherein when the at least one tension rib is pressed in a direction of the motor while the hub of the propeller rotates in a direction of being fastened to the construction, the at least one tension rib is elastically deformed, from a first state to a second state, in the direction of the motor due to the at least one second protrusion.

9. The unmanned aerial vehicle of claim 8, wherein the at least one tension rib is restored to the first state by being supported by the at least one second protrusion when the hub of the propeller is affixed to the construction.

10. The unmanned aerial vehicle of claim 7, wherein the tension protrusion further comprises an inclined portion.

11. The unmanned aerial vehicle of claim 7, wherein each of the at least one tension rib corresponds to one of the at least one second protrusion, respectively.

12. The unmanned aerial vehicle of claim 1, wherein a protrusion length of the fixing shaft is based on an elastic deformation of the at least one tension rib.

13. The unmanned aerial vehicle of claim 1, further comprising a camera.

* * * * *